United States Patent
Lee et al.

(10) Patent No.: US 9,060,068 B2
(45) Date of Patent: Jun. 16, 2015

(54) APPARATUS AND METHOD FOR CONTROLLING MOBILE TERMINAL USER INTERFACE EXECUTION

(75) Inventors: Hyun-jeong Lee, Seoul (KR); Joon-ah Park, Seoul (KR); Wook Chang, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 950 days.

(21) Appl. No.: 12/222,451

(22) Filed: Aug. 8, 2008

(65) Prior Publication Data

US 2009/0201260 A1     Aug. 13, 2009

(51) Int. Cl.
G06F 3/041     (2006.01)
H04M 1/725     (2006.01)
G06F 3/0488     (2013.01)

(52) U.S. Cl.
CPC ....... *H04M 1/72522* (2013.01); *G06F 3/04883* (2013.01); *H04M 2250/22* (2013.01)

(58) Field of Classification Search
CPC .......... G06F 3/04883; H04M 1/72522; H04M 2250/22
USPC .................................................. 345/173, 174
See application file for complete search history.

(56) References Cited

U.S. PATENT DOCUMENTS

| | | | | |
|---|---|---|---|---|
| 5,543,588 | A * | 8/1996 | Bisset et al. | 178/18.06 |
| 5,898,434 | A * | 4/1999 | Small et al. | 715/810 |
| 6,020,878 | A | 2/2000 | Robinson | |
| 7,123,243 | B2 * | 10/2006 | Kawasaki et al. | 345/173 |
| 7,834,861 | B2 * | 11/2010 | Lee | 345/173 |
| 8,373,665 | B2 * | 2/2013 | Comerford | 345/173 |
| 8,519,986 | B2 * | 8/2013 | Park et al. | 345/184 |
| 2003/0234768 | A1 * | 12/2003 | Rekimoto et al. | 345/169 |
| 2004/0263484 | A1 * | 12/2004 | Mantysalo et al. | 345/173 |
| 2006/0097994 | A1 * | 5/2006 | Miyakoshi | 345/173 |
| 2006/0111093 | A1 * | 5/2006 | Shim et al. | 455/418 |
| 2006/0197750 | A1 * | 9/2006 | Kerr et al. | 345/173 |

(Continued)

FOREIGN PATENT DOCUMENTS

| | | |
|---|---|---|
| JP | 8-44493 | 2/1996 |
| JP | 2000-066803 | 3/2000 |
| JP | 2002-318640 | 10/2002 |

(Continued)

OTHER PUBLICATIONS

Korean Office Action issued Mar. 31, 2014 in Korean Patent Application No. 10-2008-0012335.

(Continued)

*Primary Examiner* — Kwang-Su Yang
(74) *Attorney, Agent, or Firm* — Harness, Dickey & Pierce, PLC

(57) ABSTRACT

A mobile terminal control apparatus and method is disclosed. The mobile terminal control apparatus includes a plurality of touch sensors formed on a rear of the mobile terminal, a touch recognition unit recognizing a touch of a finger sensed by the plurality of touch sensors and displaying a user interface on a front screen of the mobile terminal according to the recognized touch of the finger, and an execution unit recognizing a change in the touch of the finger, and executing the displayed user interface on the basis of the result of the recognition. The mobile terminal may control user interfaces of a mobile terminal without fingers overlapping a screen of the mobile terminal.

22 Claims, 8 Drawing Sheets

(56) References Cited

U.S. PATENT DOCUMENTS

| | | | |
|---|---|---|---|
| 2009/0009482 A1* | 1/2009 | McDermid | 345/173 |
| 2009/0150541 A1* | 6/2009 | Georgis | 709/224 |

FOREIGN PATENT DOCUMENTS

| | | |
|---|---|---|
| JP | 2003-330611 | 11/2003 |
| JP | 2004-110380 | 4/2004 |
| JP | 2004-288077 | 10/2004 |
| KR | 10-2004-0058528 | 5/2004 |
| KR | 10-2006-0029237 | 4/2006 |
| KR | 10-2007-0001447 | 4/2007 |
| WO | 2004/114636 | 12/2004 |

OTHER PUBLICATIONS

Korean Notice of Allowance issued Aug. 28, 2014 in Korean Patent Application No. 10-2008-0012335.

* cited by examiner

APPARATUS AND METHOD FOR CONTROLLING MOBILE TERMINAL USER INTERFACE EXECUTION

CROSS-REFERENCE TO RELATED APPLICATIONS

This application claims priority from Korean Patent Application No. 10-2008-0012335, filed on Feb. 11, 2008, the disclosure of which is incorporated herein in its entirety by reference.

BACKGROUND

1. Field

One or more embodiments of the present invention relate to a mobile terminal, and more particularly, to an apparatus and method controlling a mobile terminal using a touch sensor.

2. Description of the Related Art

Recently, mobile terminals such as cellular phones have had many user interfaces, such as menu keys or buttons, with the increase of available functions. Due to complication of user interfaces, a user of a mobile terminal feels difficulties in quickly selecting or setting a user interface having a specific function.

For this reason, a method of displaying a Graphic User Interface (GUI) instead of a physical user interface on a screen of a mobile terminal, to allow a user to select or set a desired function through the GUI, has been proposed. For example, there is a method of forming the front surface of a mobile terminal as a touch screen. However, if the front surface of a mobile terminal is formed as a touch screen, a part of the touch screen will be covered with a touching element, e.g., a finger(s) when a user touches a GUI displayed on the touch screen. In this case, the user cannot see the part of the touch screen, which may cause inconvenience to the user.

Also, when the user tries to touch the touch screen, it is inconvenient that he or she should also touch a touch area of the touch screen using a finger or a pointing means after taking his or her hand grasping the mobile phone off from the mobile terminal. Also, there is a problem that the touch screen of the mobile terminal becomes stained due to frequent touching of a touching element.

SUMMARY

One or more embodiments of the present invention provide a mobile terminal control apparatus and method that can select or set a user interface without covering any part of a screen with a touching element, such as fingers, etc.

According to an aspect of the present invention, there may be provided a mobile terminal control apparatus and method, where a user can select or set a desired function among functions of a mobile terminal using a plurality of touch sensors formed on the rear of the mobile terminal.

According to an aspect of the present invention, there is provided a mobile terminal control apparatus including a plurality of touch sensors on a rear of the mobile terminal, a touch recognition unit recognizing a touch of a finger sensed by at least one of the plurality of touch sensors and displaying a user interface on a front screen of a front of the mobile terminal according to the recognized touch of the finger, and an execution unit recognizing a change in the touch of the finger and executing the displayed user interface on the basis of the result of the recognition.

According to another aspect of the present invention, there is provided a mobile terminal control method including recognizing a touch of a finger sensed by at least one of a plurality of touch sensors on a rear of the mobile terminal, displaying a user interface on a front screen of the mobile terminal according to the recognized touch of the finger, and recognizing a change in the touch of the finger and executing the user interface based on a result of the recognition of the change in the touch of the finger.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
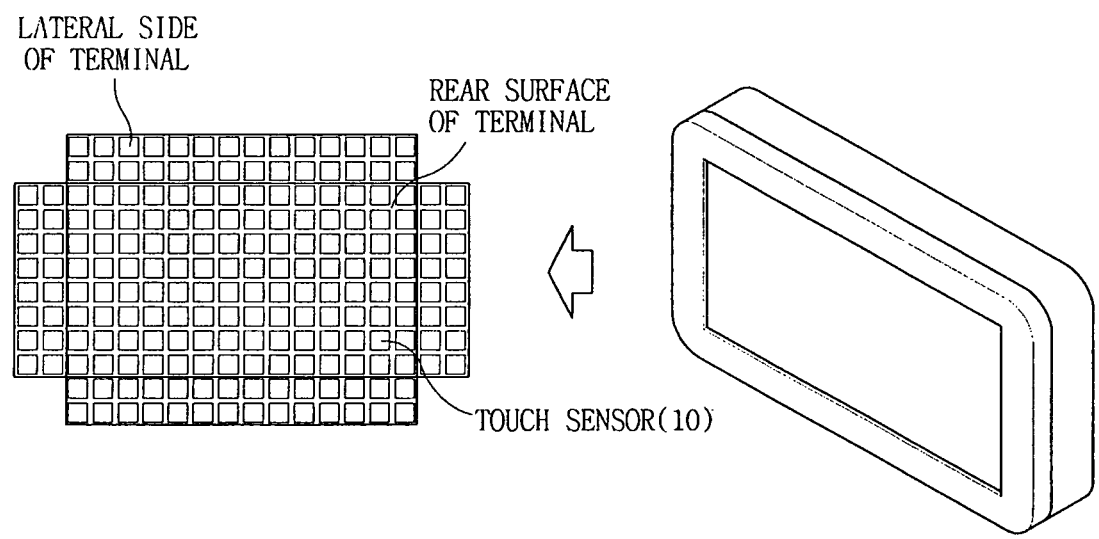
FIG. 1 is a development view and a perspective view of a mobile terminal control apparatus according to an embodiment of the present invention.

Reference will now be made in detail to embodiments, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 is a development view and a perspective view of a mobile terminal control apparatus 1 according to an embodiment of the present invention.

Referring to FIG. 1, the mobile terminal control apparatus 1 includes a plurality of touch sensors 10 formed on the rear of a mobile terminal. Here, the mobile terminal may be a cellular phone, a personal digital assistant (PDA), a MP3 player, a portable multimedia player (PMP), or any other mobile device or any other multimedia player. The front of the mobile terminal includes a display screen such as a liquid crystal display (LCD), and a plurality of transparent touch sensors may be included in the display screen.

The plurality of touch sensors 10 are formed on the rear of the mobile terminal, as described above, however, as illustrated in FIG. 1, may be formed on the lateral sides of the mobile terminal as well as on the rear of the mobile terminal. Here, the plurality of touch sensors 10 may be arranged in the form of grids on the whole rear surface of the mobile terminal. That is, as illustrated in FIG. 1, the plurality of touch sensors 10 are arranged in the form of a plurality of blocks, wherein each block can recognize a touch of a user or a change in the touch of a user.

Further, each touch sensor 10 may be a pressure sensor or a capacitive sensor.

As such, since the plurality of touch sensors 10 are formed on the rear and lateral sides of the mobile terminal, instead of on the front of the mobile terminal, a user can execute or select a user interface while grasping the mobile terminal with his or her hand. That is, a user can use the mobile terminal while seeing the whole screen of the mobile terminal without covering any part of a screen with a touching means, such as the user's finger or a pointing device.

For example, when a user tries to touch a Graphic User Interface (GUI) for zooming a map if the front screen of the mobile terminal is a touch screen and no touch sensor exists on the rear of the mobile terminal, the GUI overlaps a part of the touch screen on which the map is displayed, and thus the user may feel difficulties in recognizing the map at the part which the GUI overlaps.

However, when user interfaces are controlled using the plurality of touch sensors 10 formed on the rear of the mobile terminal, flexible control of user interfaces while maintaining the position of a hand grasping the mobile phone is possible.

Figure 2:
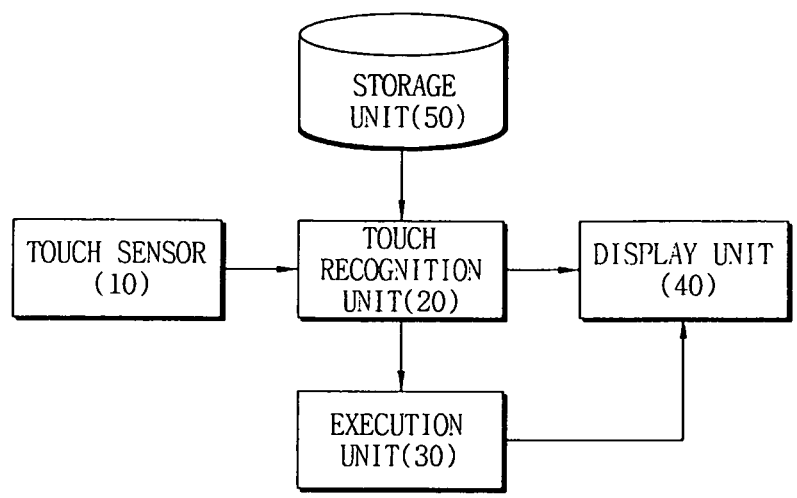
FIG. 2 is a block diagram of a mobile terminal control apparatus according to an embodiment of the present invention.

FIG. 2 is a block diagram of a mobile terminal control apparatus 1 according to an embodiment of the present invention.

Referring to FIG. 2, the mobile terminal control apparatus 1 includes a plurality of touch sensors 10, a touch recognition unit 20, an execution unit 30, and a display unit 40. The mobile terminal control apparatus 1 can further include a storage unit 50.

The plurality of touch sensors 10 are arranged on the rear of a mobile terminal. The plurality of touch sensors 10 are arranged on the lateral sides of the mobile terminal as well as on the rear of the mobile terminal. Forming the plurality of touch sensors 10 on the lateral sides of the mobile terminal is aimed to allow the touch sensors 10 to easily sense touches of fingers when the touch areas of fingers increase.

The touch recognition unit 20 recognizes touches of fingers through the plurality of touch sensors 10 formed on the rear and lateral sides of the mobile terminal, and displays a user interface on a front screen of the mobile terminal. Here, the user interface can be displayed through the display unit 40. The user interface may be menus, keys, number data, character data, or image data, which can be displayed on a screen. Or, the user interface may be an interface (for example, a functional icon) having a specific function for each program. However, the present invention is not limited to the above-mentioned examples, and various interfaces can be used.

The touch recognition unit 20 recognizes the touches of user fingers sensed by the plurality of touch sensors 10, detects signals from the results of the recognition, and combines the detected signals. For example, if the touch recognition unit 20 recognizes a touch of a user finger sensed by a touch sensor 10, the touch recognition unit 20 outputs a "high" signal, and if no touch is recognized by the touch recognition unit 20, the touch recognition unit 20 outputs a "low" signal. Here, by setting the "high" signal to a bit value "1" and the "low" signal to a bit value "0" and combining bits of the detected signals, touch areas touched by the user fingers can be recognized. That is, if the bit combination of detected signals is "10001100", the touch recognition unit 20 can recognize touch areas by determining that touches of user fingers occur at areas corresponding to a bit value "1".

Meanwhile, the touch recognition unit 20 can display a user interface on an area of the front screen of the mobile terminal, which corresponds to an area recognized by a touch of a user finger. That is, it is possible to set the number of user interfaces that are to be displayed on the front screen of the mobile terminal, according to the distribution of touch areas which can be recognized by touches of user fingers. Details therefor will be described later with reference to FIG. 3.

Also, when all user interfaces cannot be displayed on the front screen of the mobile terminal, a user interface having a mobility function or a sub user interface can be additionally displayed on the front screen of the mobile terminal. Further, the touch recognition unit 20 can display guide lines corresponding to the recognized shape of user fingers on the front screen of the mobile terminal. Also, the touch recognition unit 20 can display a user interface for an application program which is being executed, on the front screen of the mobile terminal.

Meanwhile, the execution unit 30 recognizes a change in the touches of user fingers, and executes a user interface displayed on the screen on the basis of the result of the recognition. Here, the change in the touches of user fingers may be a change in areas touched by the user fingers, a change in strength of touch pressure applied by the user fingers, or a change in the touch operations of user fingers.

In the case where the execution unit 30 recognizes a change in areas touched by user fingers, the execution unit 30 detects a signal changing successively from among signals detected from results sensed by the touch sensors 10, and determines that a touch of a user finger is moved to an area from which the signal is detected. Also, the execution unit 30 can recognize the number of blocks from which signals are detected. That is, the execution unit 30 can determine the size of a touch area by obtaining information about the number of blocks from which signals are detected.

In the case where the execution unit 30 recognizes a change in strength of touch pressure applied by user fingers, that is, if the strength of touch pressure applied by a user finger, which is sensed by a touch sensor 10, exceeds a predetermined threshold value, the execution unit 30 can execute or select a user interface displayed on the front screen of the mobile terminal. For example, if the strength of touch pressure applied by a user finger exceeds a predetermined threshold value, the execution unit 30 can recognize that the user selects the corresponding user interface, and can execute the user interface.

Also, two or more threshold values can be used. For example, a threshold value corresponding to the strength of touch pressure when a user finger contacts the rear of the mobile terminal, and another threshold value corresponding to the strength of touch pressure when a user finger presses the rear of the mobile terminal can be used. Accordingly, selection or execution of a user interface can be controlled according to the strength of touch pressure applied by a user finger, using the two threshold values.

Also, the execution unit 30 can recognize a change in the touch operation of a user finger. The touch operation may be operation, such as "click", "tap", "drag", or "flick", which can manipulate a mobile device. The click and tap operations may be distinguished from each other according to the strength of touch pressure applied by a user finger, and the drag operation may be distinguished from other operations according to the size of a touch area. Details for a process in which the execution unit 30 executes user interfaces according to the touch operations will be described later with reference to FIG. 4.

Meanwhile, the execution unit 30 can correct a result recognized by a touch of a user finger and execute a user interface displayed on the front screen of the mobile terminal according to the corrected result. This is aimed to select or execute a user interface according to the user's intention by optimizing an area touched by a user finger when the user finger incorrectly touches a desired area of the rear of the mobile terminal. Details therefor will be described later with reference to FIG. 6.

The storage unit 50 can store user interfaces that are to be displayed on the front screen of the mobile terminal according to the use frequencies of the user interfaces. That is, the storage unit 50 can store an execution probability value for each user interface. The touch recognition unit 20 can priorly display a user interface having a great probability value among user interfaces stored in the storage unit 50, on the front screen of the mobile terminal.

Figure 3:
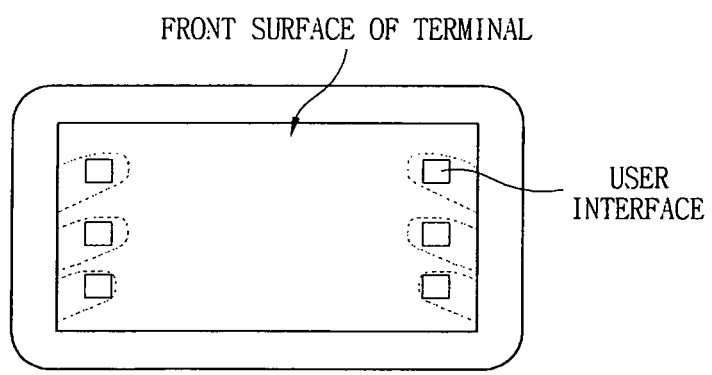
FIG. 3 is a view showing user interfaces according to an embodiment of the present invention.

FIG. 3 is a view for explaining user interfaces according to an embodiment of the present invention;

Referring to FIG. 3, the mobile terminal control apparatus 1 illustrated in FIG. 1 can recognize touches of user fingers sensed by a plurality of touch sensors arranged on the rear of a mobile terminal, and display user interfaces on areas of the front screen of the mobile terminal, which correspond to areas recognized by the touches of user fingers.

That is, the mobile terminal control apparatus 1 can set the locations and numbers of user interfaces according to the distribution of touch areas on the rear of the mobile terminal touched by user fingers. For example, as illustrated in FIG. 3, if there are three groups of blocks from which touches are sensed in the rear right side of the mobile terminal, the mobile terminal control apparatus 1 can recognize that a user grasps the rear right side of the mobile terminal with three fingers. At this time, the touch recognition unit 20 can display three corresponding user interfaces on the front right side of the mobile terminal in correspondence with the three block groups.

In detail, the touch recognition unit 20 can calculate an average value of x-axis coordinates of areas on which user fingers are touched, and display a user interface at an appropriate location on the front screen of the mobile terminal. For example, when a touch is sensed in the rear right area of the mobile terminal, the touch recognition unit 20 displays a user interface in the front right side of the mobile terminal. Also, when user interfaces are displayed on the front screen of the mobile terminal, if the y-axis coordinates of areas touched by fingers are not aligned, the touch recognition unit 20 can correct the y-axis coordinates of the areas so that the user interfaces are aligned on the front screen of the mobile terminal.

Also, it is possible to set the types, locations and numbers of user interfaces that are to be displayed on the front screen of the mobile terminal, according to the use frequencies of the user interfaces. In order to set the types, locations and numbers of user interfaces, the mobile terminal control apparatus 1 can set priorities of the user interfaces according to the use frequencies of the user interfaces, and display the user interfaces on the front screen of the mobile terminal according to the priorities. Also, the mobile terminal control apparatus 1 can display user interfaces according to their priorities on the basis of the number of user fingers which can touch the user interfaces.

The number of user interfaces that are to be displayed on the front screen of the mobile terminal can change according to the number of fingers which can touch the user interfaces. For example, when a user takes his or her finger off from the rear of the mobile terminal, touches are sensed from two block groups, and accordingly, two user interfaces will be displayed on the front right side of the mobile terminal.

Also, it is possible to set the size of each user interface according to the number of user interfaces that are to be displayed on the front screen of the mobile terminal. Also, the number of user interfaces or the size of each user interface can be controlled in correspondence with the size of a screen of the mobile terminal and the specification of the mobile terminal.

In summary, the mobile terminal control apparatus 1 can display user interfaces on the front screen of the mobile terminal when a user grasps the mobile terminal with his or her hand. Also, the mobile terminal control apparatus 1 can allow a user to execute or select a user interface displayed on the front screen of the mobile terminal only by changing a touch of his or her finger. That is, it is possible to flexibly control user interfaces displayed on the front screen of the mobile terminal only by changing a touch of a user finger without having to move his or her hand.

Accordingly, a user can easily execute or select a user interface of the mobile terminal. Also, a user can input a selection or execution command to the mobile terminal without having to move his or her hand. For example, when the rear of the mobile terminal does not include a plurality of touch sensors and the front screen of the mobile terminal is a touch screen, a user should carefully contact the touch screen with his or her nail or finger in order to input a selection or execution command. However, the mobile terminal control apparatus 1 according to the current embodiment of the present invention allows a user to control user interfaces conveniently without having to perform such careful manipulation.

Figure 4:
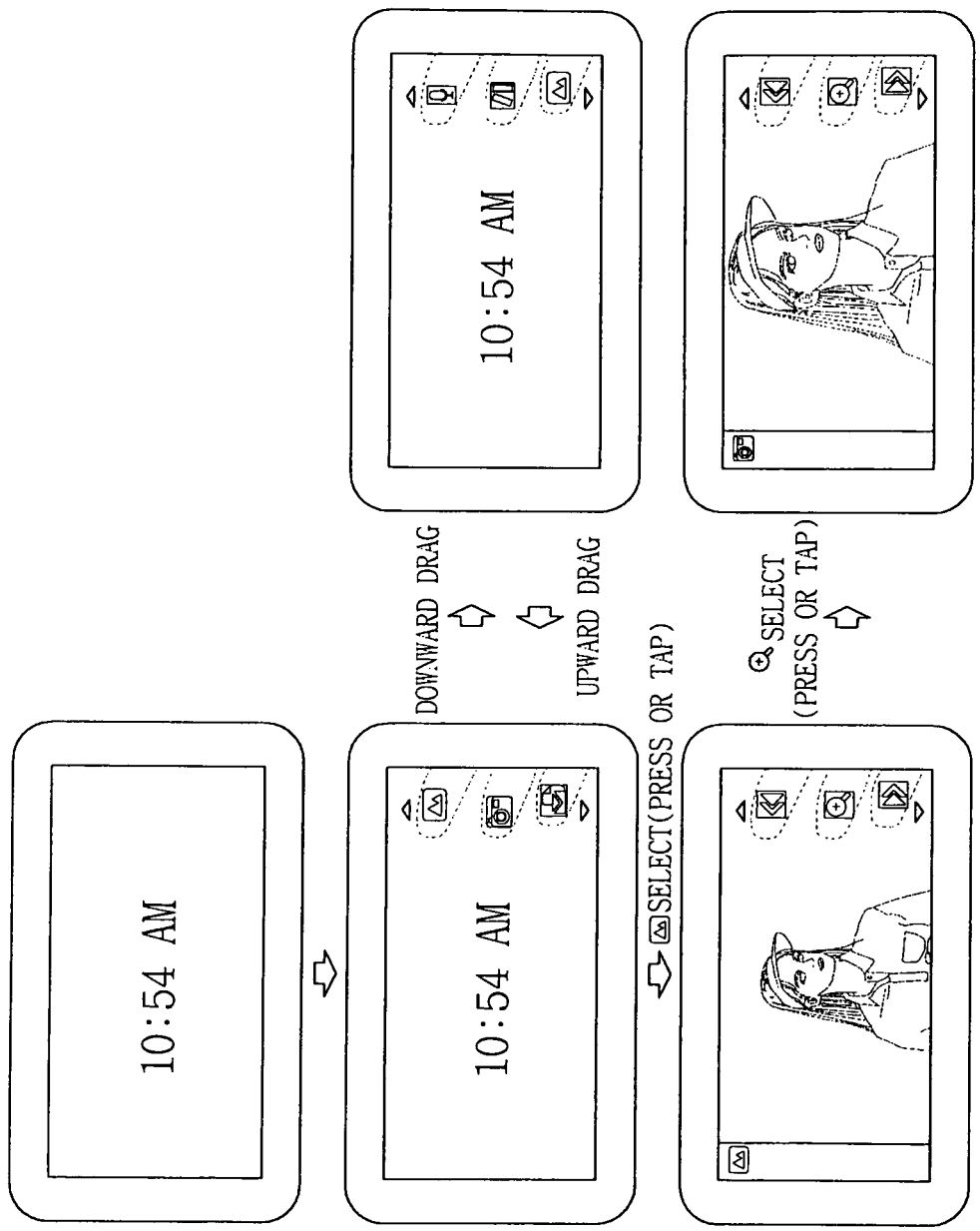
FIG. 4 is a view for explaining an example of user interface control which is performed by the mobile terminal control apparatus illustrated in FIG. 2.

FIG. 4 is a view for explaining an example of user interface control which is performed by the mobile terminal control apparatus illustrated in FIG. 2.

Referring to FIG. 4, the execution unit 30 (see FIG. 2) can recognize a change in the touch operation of fingers while a user grasps a mobile terminal with his or her hand. The change in the touch operation may be operation, such as "click", "tap", "drag", or "flick". Also, the execution unit 30 can recognize a change in strength of touch pressure applied by a finger as a click or tap operation, and executes the click or tap operation. Also, the execution unit 30 can recognize a change in an area which a finger touches as a drag operation, and execute the drag operation.

For example, as illustrated in FIG. 4, when a signal generated by a touch of a finger is moved downward on the rear right side of the mobile terminal, the execution unit 30 recognizes that a right finger of a user is dragged downward, and moves the corresponding user interface downward. Similar upward drag can also be detected.

In another example, as illustrated in FIG. 4, when touches of three fingers are sensed on the rear right side of the mobile terminal, if the strength of a signal sensed by the middle finger of the fingers exceeds a predetermined threshold value, the execution unit 30 recognizes that pressure is applied by the middle finger, and executes a zooming function which is the corresponding user interface. Or, if a signal sensed by the touch of the middle finger is not sensed for a short time and then is again sensed, the execution unit 30 recognizes that a user clicks the corresponding user interface with the middle finger, and executes a zooming function which is the corresponding user interface.

Meanwhile, a method in which the mobile terminal control apparatus 1 recognizes the motion of a user's fingers and controls user interfaces according to the result of the recognition, according to an embodiment of the present invention, can be modified in various ways. Also, the motion of the user's fingers includes all user input operations which can be executed in a mobile device, other than the click, tap, and drag operations described above.

Therefore, the mobile terminal control apparatus 1 can control user interfaces only by moving a finger without having to move a hand. Accordingly, a user can utilize a mobile terminal conveniently.

Also, since user interfaces can be controlled for each finger so that fingers can respectively perform different functions, effective user interface control is possible. Also, since the user can select or execute a desired user interface displayed on a screen without having to take his hand off from a mobile terminal, it is possible to prevent the screen from being stained by a touch device, for example, by fingers.

Figure 5:
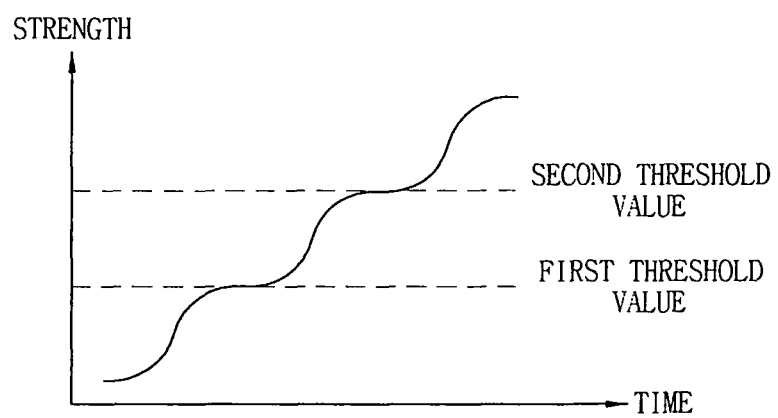
FIG. 5 is a graph showing an example of a touch recognition method according to the strength of touch pressure.

FIG. 5 is a graph showing touch recognition according to the strength of touch pressure.

Referring to FIG. 5, the mobile terminal control apparatus 1 (see FIG. 2) can control user interfaces according to the strength of touch pressure applied by fingers, which is sensed by a pressure sensor. For example, as plotted in FIG. 5, when two threshold values of first and second threshold values are used, if the strength of touch pressure applied on the rear of a mobile terminal does not exceed the first threshold value, the mobile terminal control apparatus 1 recognizes that no touch occurs on the rear of the mobile terminal, and if the strength of the touch pressure exceeds the first threshold value but does not exceed the second threshold value, the mobile terminal control apparatus 1 recognizes it as a touch operation and thus displays the corresponding user interface on the front screen of the mobile terminal.

Meanwhile, if the strength of the touch pressure exceeds the second threshold value, the mobile terminal control apparatus 1 recognizes that a user clicks the corresponding user interface, and performs a function corresponding to the click operation. However, threshold values may be set to one or more values, and the user interfaces can be controlled in various ways according to the number of threshold values.

Figure 6:
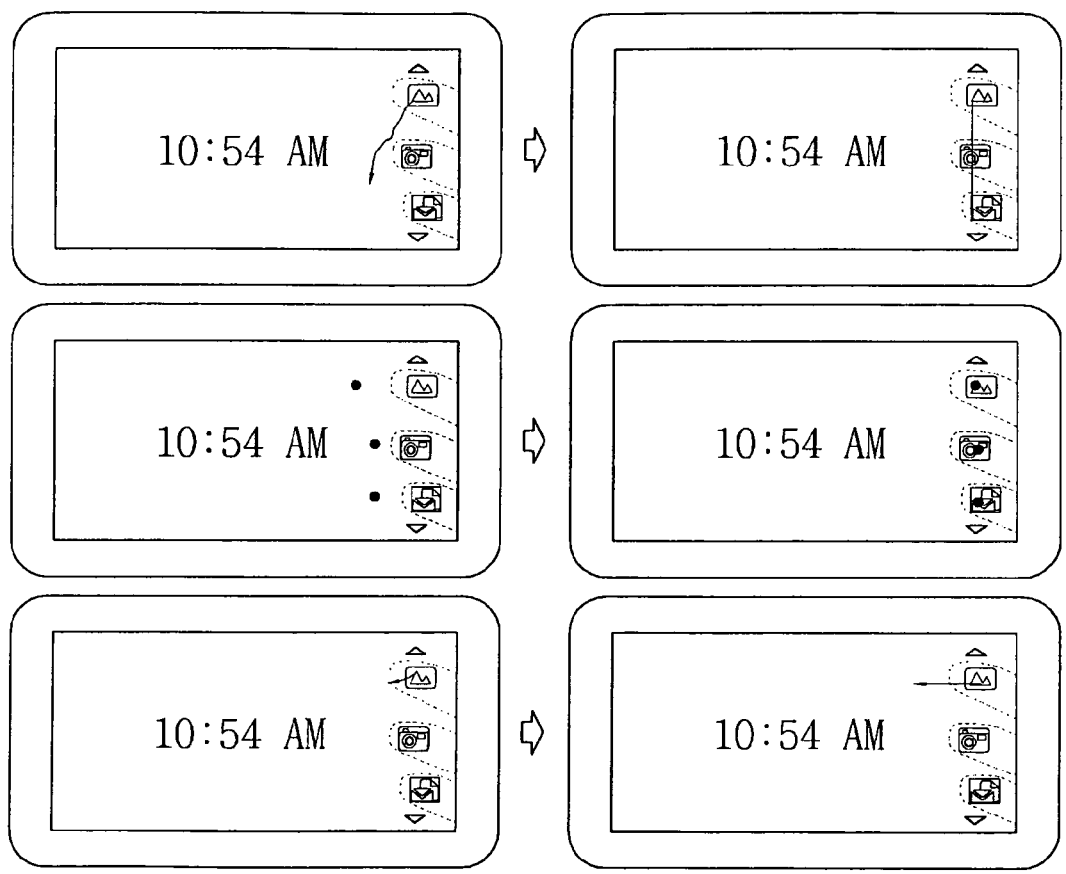
FIG. 6 is a view for explaining an example of a method of correcting the results touched by a finger, for example, in the mobile terminal control apparatus illustrated in FIG. 2.

FIG. 6 is a view for explaining an example of a method of correcting the results touched by a finger, for example, in the mobile terminal control apparatus 1 illustrated in FIG. 2.

Referring to FIG. 6, the mobile terminal control apparatus 1 can correct the recognized results touched by fingers. When a user grasps a mobile terminal with his hand, his or her fingers may not touch the mobile terminal according to his or her intention. For example, a user operation may not be performed at the exact location intended by the user, or may not be straight-line motion.

However, the mobile terminal control apparatus 1 can correct the results recognized by a touch of a user according to a predetermined criterion. For example, as illustrated in FIG. 6, when a user performs an inaccurate scroll operation, the mobile terminal control apparatus 1 can correct an inclined vector generated by the inaccurate scroll operation to a vertical vector according to a predetermined criterion.

In another example, when a user touches a specific location, the mobile terminal control apparatus 1 recognizes that a user interface which is within a predetermined range from the specific location is touched, and selects the user interface. In detail, when the location of a touch of a finger is not matched to the location of a menu displayed on the front screen of the mobile terminal, the mobile terminal control apparatus 1 calculates distances from a location touched by the finger to menus adjacent to the touched location, and selects a menu nearest to the touched location from among the menus adjacent to the touched location.

Accordingly, the user can select a desired user interface easily without having to touch the exact location of the user interface. Particularly, while a user is moving, the user can easily control user interfaces only by roughly moving his or her fingers without having to contact or press the exact location of each user interface.

In another example, when a user performs a drag operation within a predetermined range, the mobile terminal control apparatus 1 can correct an area dragged by the drag operation to an area smaller or greater than the area actually dragged. For example, as illustrated in FIG. 6, when a user performs a drag operation roughly, a user interface corresponding to the drag operation can be moved according to the user's intention through a correction function such as line interval adjustment of the desktop.

Accordingly, user input processing can be optimized. That is, since the mobile terminal control apparatus 1 corrects an inaccurate or inexact user input operation under a predetermined condition, user input loads can be reduced. Also, since a corrected user input is output through the front screen of the mobile terminal, output processing can also be optimized. Meanwhile, various methods of optimizing input or output processing, other than the above-described method, can be used.

Figure 7:
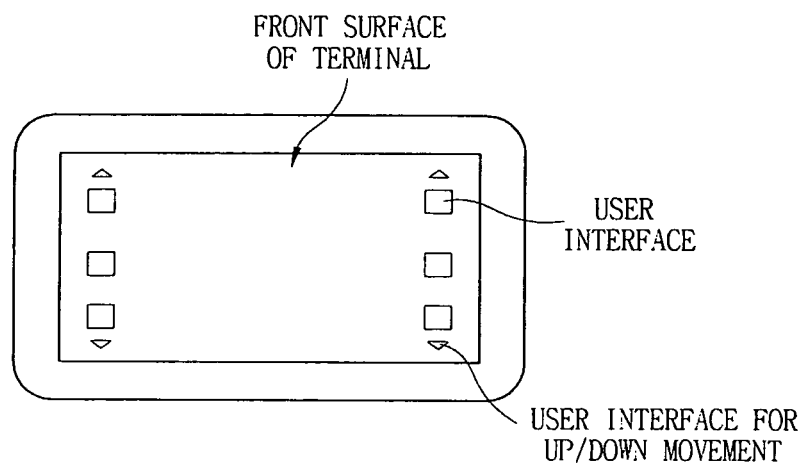
FIG. 7 is a view for explaining an additional user interface according to an embodiment of the present invention.

FIG. 7 is a view for explaining an additional user interface according to an embodiment of the present invention.

Referring to FIG. 7, when the mobile terminal control apparatus 1 (see FIG. 2) recognizes a touch of a finger through a plurality of touch sensors and displays the corresponding user interface on the front screen of a mobile terminal, the mobile terminal control apparatus 1 can display an additional user interface on the screen when all user interfaces cannot be displayed on the screen. That is, a sub user interface can be displayed on the front screen of the mobile terminal. The sub user interface can include a user interface having a mobility function.

For example, as illustrated in FIG. 7, menu keys having up and down scroll functions can be displayed as a sub user interface on the front screen of the mobile terminal. In this case, if a user selects the menu key having the up scroll function through a click operation, the mobile terminal control apparatus 1 can display another user interface on the screen.

Accordingly, the user can use an additional user interface (for example, another menu) by using a sub user interface. Here, the user interface can be executed by strongly pressing the rear part of the mobile terminal with a finger or by taking a finger off from the rear part of the mobile terminal and then again contacting the rear part of the mobile terminal while he or she keeps grasping the mobile terminal with his hand.

Further, since all user interfaces need not to be displayed on the front screen of the mobile terminal by using such an additional user interface, the construction of the screen can be simplified, the case where user interfaces overlap the screen can be prevented, and convenient manipulation is possible.

Figure 8:
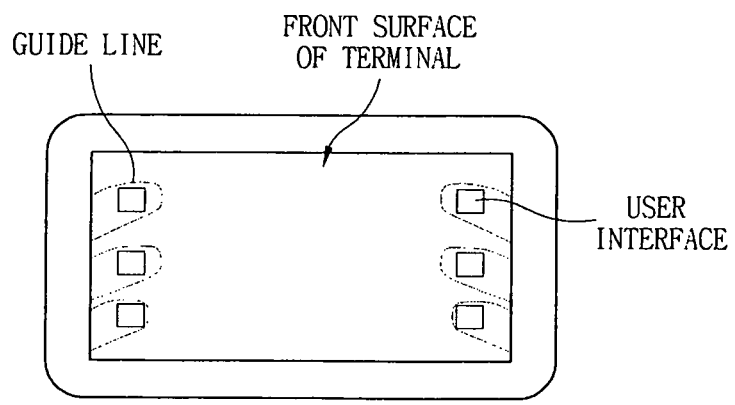
FIG. 8 is a view for explaining guide lines according to an embodiment of the present invention.

FIG. 8 is a view for explaining guide lines according to an embodiment of the present invention.

Referring to FIG. 8, the mobile terminal control apparatus 1 can display guide lines corresponding to the recognized shape of fingers on the front screen of a mobile terminal. For example, when signals are sensed from three contact area groups through a plurality of touch sensors, the outlines of fingers can be displayed in the form of guide lines at the corresponding locations of the front screen of the mobile terminal. Accordingly, since the user can check the position of his or her hand which grasps the mobile terminal while viewing it through a screen, the user can select a desired user interface more correctly compared to when no guide line is provided.

Figure 9:
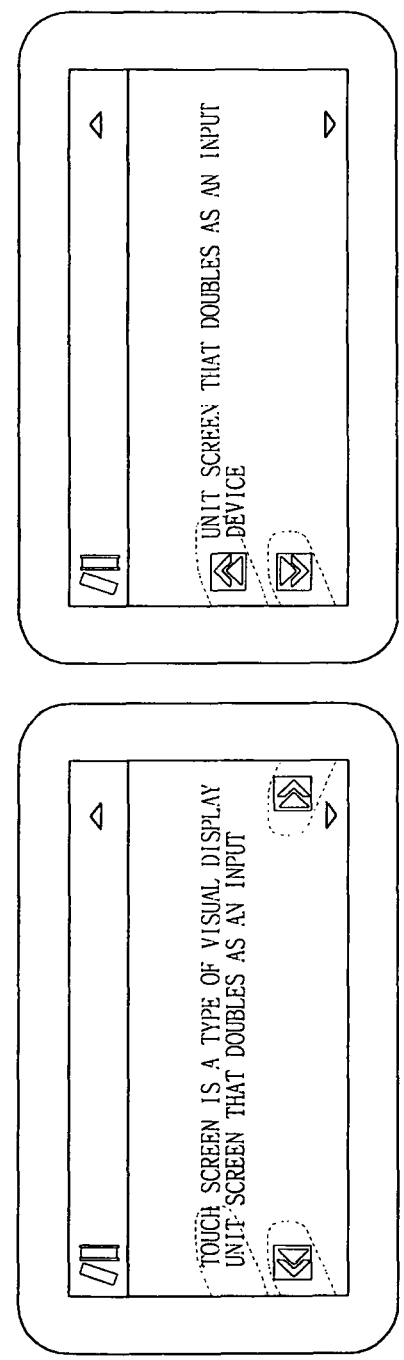
FIG. 9 is a view for explaining a user interface for each application program, according to an embodiment of the present invention.

FIG. 9 is a view for explaining a user interface for each application program, according to an embodiment of the present invention.

Referring to FIG. 9, the mobile terminal control apparatus 1 can display a user interface for an application program which is being currently executed, on the front screen of the mobile terminal. For example, as illustrated in FIG. 9, when the application program is an electronic book (E-book), the user interface can include a up/down scroll menu key or a left/right scroll menu key. In this case, the up/down scroll menu key corresponds to a page previous/next function. Also, no menu key is displayed on a screen while a user reads writings, but a menu key which can be manipulated by a user is displayed on the screen when the user touches the rear part of the mobile terminal as necessary.

In another example, when the application program is a path search program, user interfaces, such as menu keys, e.g., with respective front touch sensors, corresponding to area zooming, distance calculation, and shortest path selection, can be displayed on the front screen of the mobile terminal. Also, a user interface for an application program may be keys, number data, character data, or image data as well as a menu. Also, the user interfaces displayed on the front screen of the mobile terminal can be reconfigured for each application program in correspondence with the characteristics of the mobile terminal.

Meanwhile, the mobile terminal control apparatus 1 can store the user interfaces for each application program according to the use frequencies of the user interfaces, in a storage unit 50. Here, the touch recognition unit 20 (see FIG. 2) displays the user interfaces stored in the storage unit 50 on the front screen of the mobile terminal, and can display user interfaces having an additional selection function, as illustrated in FIG. 7, on the screen, when all the user interfaces stored in the storage unit 50 cannot be displayed.

Figure 10:
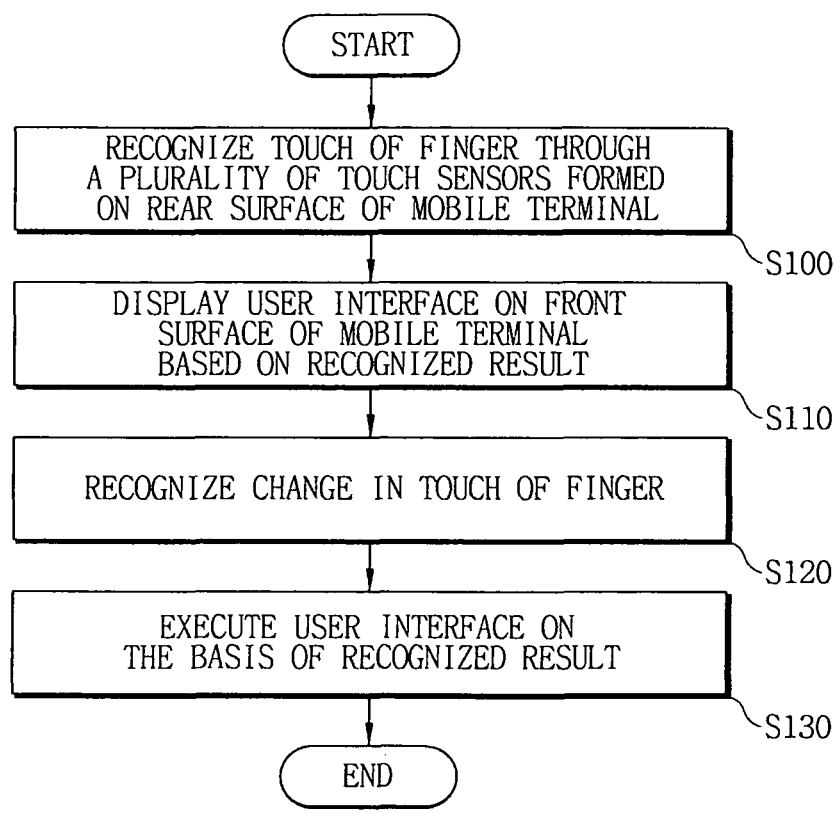
FIG. 10 is a flowchart of a mobile terminal control method according to an embodiment of the present invention.

FIG. 10 is a flowchart of a mobile terminal control method according to an embodiment of the present invention.

Referring to FIG. 10, the mobile terminal control apparatus 1 (see FIG. 2) recognizes touches of fingers which are sensed by a plurality of touch sensors 10 formed on the rear of the mobile terminal (operation S100). Here, the plurality of touch sensors 10 may be arranged in the form of grids. Also, each touch sensor 10 may be a pressure sensor or a capacitive sensor.

Successively, the mobile terminal control apparatus 1 displays user interfaces on a front screen of the mobile terminal on the basis of the results of the recognition (operation S110). The user interfaces may be menus, keys, number data, character data, or image data. The user interfaces can be displayed on the front screen areas of the mobile terminal, which correspond to the rear areas of the mobile terminal on which the user fingers are touched. Also, if all the user interfaces cannot be displayed on the front screen of the mobile terminal, a sub user interface or a movable user interface can be additionally displayed on the front screen of the mobile terminal. Also, guide lines corresponding to the recognized shape of fingers can be displayed on the front screen of the mobile terminal.

The mobile terminal control apparatus 1 recognizes a change in touches of user fingers (operation S120). Here, the change in the touches of the user fingers may be a change in areas touched by the user fingers, a change in strength of touch pressure applied by the user fingers, or a change in the touch operations. That is, the mobile terminal control apparatus 1 can recognize a change in touch areas by recognizing a change in signals detected from the touch areas sensed by the plurality of touch sensors. Or, the mobile terminal control apparatus 1 can recognize whether the strength of touch pressure applied by a finger, which is sensed by the plurality of touch sensors, exceeds a predetermined value.

The mobile terminal control apparatus 1 executes a user interface on the basis of the results of the recognition (operation S130). Operation for executing the user interface may be operation, such as "click", "drag", "tap", or "flick". The click and tap operations may be distinguished from each other according to the strength of touch pressure applied by a user finger, and the drag operation may be distinguished from other operations according to the size of a touch area.

Also, the mobile terminal control apparatus 1 can correct a result recognized by a touch of a user finger and execute a user interface displayed on the front screen of the mobile terminal according to the corrected result. That is, since the mobile terminal control apparatus 1 corrects an inaccurate or inexact user input operation under a predetermined condition, user input loads can be reduced. Also, since a corrected user input is output through the front screen of the mobile terminal, output processing can also be optimized.

In summary, in differing embodiments it is possible to control user interfaces of a mobile terminal conveniently without fingers covering a screen of the mobile terminal, by utilizing a mobile terminal control apparatus according to an embodiment of the present invention. That is, it is possible to easily control user interfaces using fingers. Accordingly, a user can utilize a mobile terminal conveniently.

Also, since user interfaces can be controlled for each finger so that fingers can respectively perform different functions, effective user interface control is possible. Also, since the user can select or execute a desired user interface displayed on a screen without having to take his hand off from a mobile terminal, it is possible to prevent the screen from being stained by a touch device, for example, by fingers.

Furthermore, since a recognized touch result can be corrected, user input processing can be optimized. That is, since the mobile terminal control apparatus 1 corrects an inaccurate or inexact user input operation under a predetermined condition, it is possible to reduce user input loads. Also, since a corrected user input is output through the front screen of the mobile terminal, output processing can also be optimized.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A mobile terminal control apparatus, comprising:
   a plurality of touch sensors on a rear of the mobile terminal;
   a touch recognition unit recognizing a touch of one or more fingers sensed by at least one of the plurality of touch sensors and displaying a respective user interface on a front screen on a front of the mobile terminal according to a location of the recognized touch of the one or more fingers, so as to match a location of the displayed respective user interface on the front screen to the location of the recognized touch of the one or more fingers; and an execution unit recognizing a respective change in the touch of the one or more fingers and executing the displayed respective user interface on a basis of a result of the recognition of the respective change in the touch of the one or more fingers, wherein, when all user interfaces cannot be displayed on the front screen of the mobile terminal, the touch recognition unit additionally displays a sub user interface or a movable user interface on the front screen of the mobile terminal, and recognizes a change in touches of user fingers on the rear of the mobile terminal matched to one or more locations of the sub user interface or movable user interface.

2. The mobile terminal control apparatus of claim 1, wherein the recognizing of the respective change in the touch of the one or more fingers includes a change in a touch of a finger in an area of the at least one touch sensor touched by the finger, a change in strength of touch pressure applied by the finger, or a change in a touch operation.

3. The mobile terminal control apparatus of claim 1, wherein the execution unit recognizes a signal sensed by the at least one touch sensor and executes the displayed respective user interface according to a recognized change in an area of the plurality of touch sensors from which the signal is sensed.

4. The mobile terminal control apparatus of claim 1, wherein the execution unit executes the displayed respective user interface when a strength of respective touch pressures applied by the one or more fingers exceeds a predetermined value.

5. The mobile terminal control apparatus of claim 1, wherein the execution unit corrects a location of a respective change in the touch of the one or more fingers and executes the displayed respective user interface according to a result of the correction of the location of the respective change in the touch of the one or more fingers.

6. The mobile terminal control apparatus of claim 1, wherein the touch recognition unit displays the respective user interface on respective areas of the front screen of the mobile terminal that correspond to areas of the plurality of touch sensors touched by the one or more fingers.

7. The mobile terminal control apparatus of claim 1, wherein the touch recognition unit displays a guide line, corresponding to a recognized shape of the one or more fingers, on the front screen of the mobile terminal.

8. The mobile terminal control apparatus of claim 1, further comprising a storage unit storing the respective user interface according to a use frequency of the respective user interface, wherein the touch recognition unit displays on the front screen of the mobile terminal the respective user interface stored in the storage unit according to the use frequency.

9. The mobile terminal control apparatus of claim 1, wherein the plurality of touch sensors are on the rear and lateral sides of the mobile terminal.

10. The mobile terminal control apparatus of claim 1, wherein the plurality of touch sensors are arranged in a grid format.

11. The mobile terminal control apparatus of claim 1, wherein the displayed respective user interface represents one of a menu, a key, number data, character data, or image data, which can be displayed on the front screen.

12. The mobile terminal control apparatus of claim 1, wherein the displayed respective user interface represents one or more user interfaces for controlling a respective function of an application that is currently being executed, with results of the application execution being displayed on the front screen with the displayed respective user interface.

13. A mobile terminal apparatus, comprising:
a plurality of touch sensors on a rear of a mobile terminal;
a touch recognition unit configured to recognize a touch and location of one or more fingers sensed by at least one of the plurality of touch sensors and then configured to display a respective user interface on a front screen on a front of the mobile terminal at a second location based on the recognized location of the one or more fingers; and
an execution unit configured to recognize a change in the touch of the one or more fingers and configured to execute the displayed respective user interface on a basis of a result of the recognition of the change in the touch of the one or more fingers,
wherein the touch recognition unit sets locations and numbers of user interfaces to be displayed on the front screen based on a determined distribution of touch areas on the rear of the mobile terminal touched by the one or more fingers, and
wherein, when the determined distribution of the touch areas on the rear of the mobile terminal represents that a maximum number of fingers that can simultaneously touch an area on the rear of the mobile terminal is less than a number of available user interfaces to be displayed, user interfaces of the plurality of available user interfaces that are not initially displayed on the front screen are subsequently available to a user through a scrolling operation between the user interfaces by the one or more fingers that touch the rear of the mobile terminal.

14. The mobile terminal apparatus of claim 13, wherein the touch recognition unit is further configured to set a number of the user interfaces to be displayed on the front screen based on a number of fingers recognized by the plurality of touch sensors.

15. The mobile terminal apparatus of claim 14, wherein, when the number of fingers recognized by the plurality of touch sensors changes, the set number of user interfaces to be displayed on the front screen also changes, and
wherein the changed number of fingers recognized by the plurality of touch sensors includes at least one finger.

16. The mobile terminal apparatus of claim 13, wherein the touch recognition unit is further configured to calculate an average value of x-axis coordinates of determined areas of the rear of the mobile terminal on which fingers of the user touch, such that the second location of the displayed respective user interface is based on the calculated average value.

17. The mobile terminal apparatus of claim 13, wherein, in the displaying of the respective user interface on the front screen, the user interfaces are displayed according to a respective use frequency of the respective user interface.

18. The mobile terminal apparatus of claim 13, wherein, in the displaying of the respective user interface on the front screen, the user interfaces are displayed according to respective priorities based on the maximum number of fingers that can simultaneously touch the area of the rear of the mobile terminal.

19. A mobile terminal control method, comprising:
recognizing a touch of one or more fingers sensed by at least one of a plurality of touch sensors on a rear of the mobile terminal;
displaying a respective user interface on a front screen of the mobile terminal according to a location of the recognized touch of the one or more fingers, so as to match a location of the displayed respective user interface on the front screen to the location of the recognized touch of the one or more fingers; and recognizing a change in the touch of the one or more fingers and executing a displayed user interface based on a result of the recognition of the change in the touch of the one or more fingers, wherein the displaying of the respective user interface includes simultaneously displaying a plurality of user interfaces on the front screen on the front of the mobile terminal according to recognized touches of a plurality of fingers, and wherein, when all user interfaces cannot be displayed on the front screen of the mobile terminal, the displaying of the user interface includes additionally displaying a sub user interface or a movable user interface on the front screen of the mobile terminal and the recognizing of the change in the touch of the one or more fingers further includes recognizing a change in the recognized touches on the rear of the mobile terminal matched to one or more locations on the sub user interface or the movable user interface.

20. The mobile terminal control method of claim 19, wherein the recognizing of the change in the touch of the one or more fingers and the executing of the user interface comprises:

recognizing a change in an area of the plurality of touch sensors touched by a finger, a change in strength of touch pressure applied by the finger, or a change in a touch operation, as sensed by the plurality of touch sensors; and displaying a user interface on an area of the front screen of the mobile terminal matched to the area touched by the finger based on a result of the recognition of the change to the area of the plurality of touch sensors.

21. The mobile terminal control method of claim 19, wherein the displayed respective user interface represents one of a menu, a key, number data, character data, or image data, which can be displayed on the front screen.

22. The mobile terminal control method of claim 19, wherein the displayed respective user interface represents one or more user interfaces for controlling a respective function of an application that is currently being executed, with results of the application execution being displayed on the front screen with the displayed respective user interface.

* * * * *